(12) United States Patent
Gill

(10) Patent No.: US 6,362,941 B1
(45) Date of Patent: Mar. 26, 2002

(54) SPIN VALVE SENSOR HAVING FREE LAYER STABILIZED BY FERROMAGNETIC AND SENSE CURRENT FIELDS

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/268,019

(22) Filed: Mar. 15, 1999

(51) Int. Cl.[7] .............................................. G11B 5/127
(52) U.S. Cl. .................................................. 360/324.11
(58) Field of Search ........................ 360/324.11, 324.1, 360/324.12

*Primary Examiner*—Allen Cao
(74) *Attorney, Agent, or Firm*—Gray Cary Ware & Freidenrich; Ervin F. Johnston

(57) ABSTRACT

One aspect of the present invention provides a horizontal component of a ferromagnetic coupling field on the free layer of a spin valve sensor in the same direction as a longitudinal hard biasing field for magnetically stabilizing the free layer. A second aspect of the present invention provides a sense current field in the same direction as a ferromagnetic coupling field on a free layer for promoting magnetic stabilization of the free layer. A third aspect of the present invention is a combination of the first and second aspects of the invention wherein a horizontal component of the ferromagnetic coupling field is in the same direction as a longitudinal hard biasing field and a sense current field is in the same direction as a vertical component of the ferromagnetic coupling field on the free layer.

37 Claims, 12 Drawing Sheets

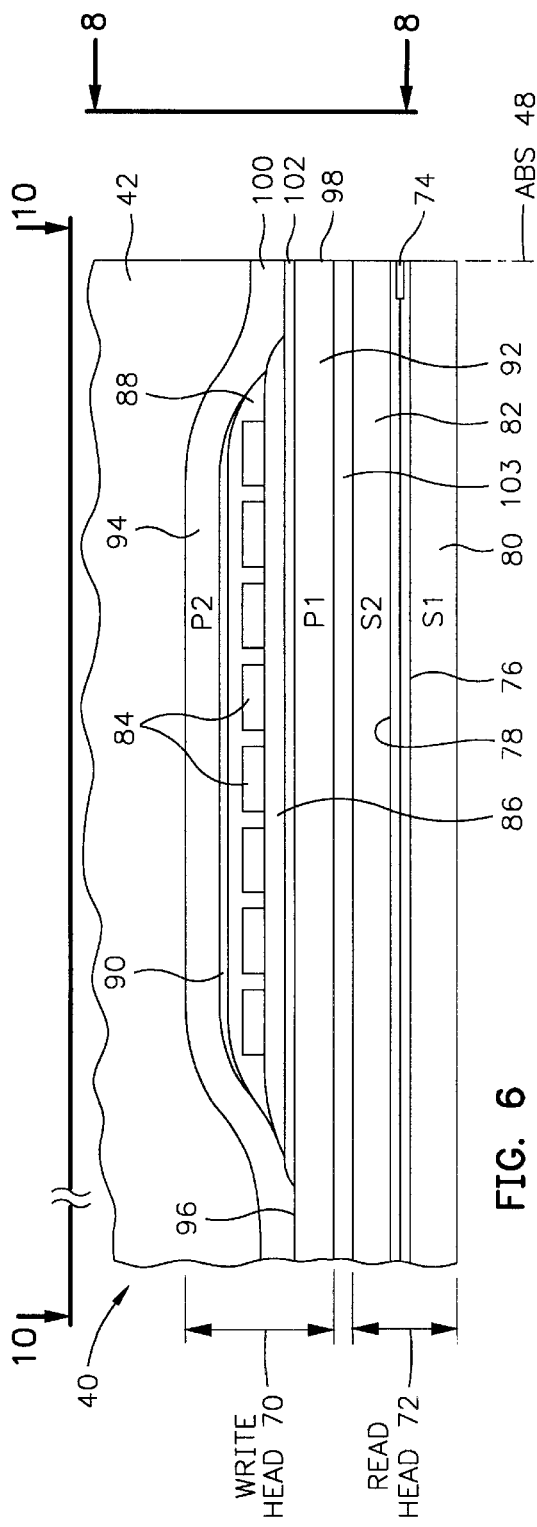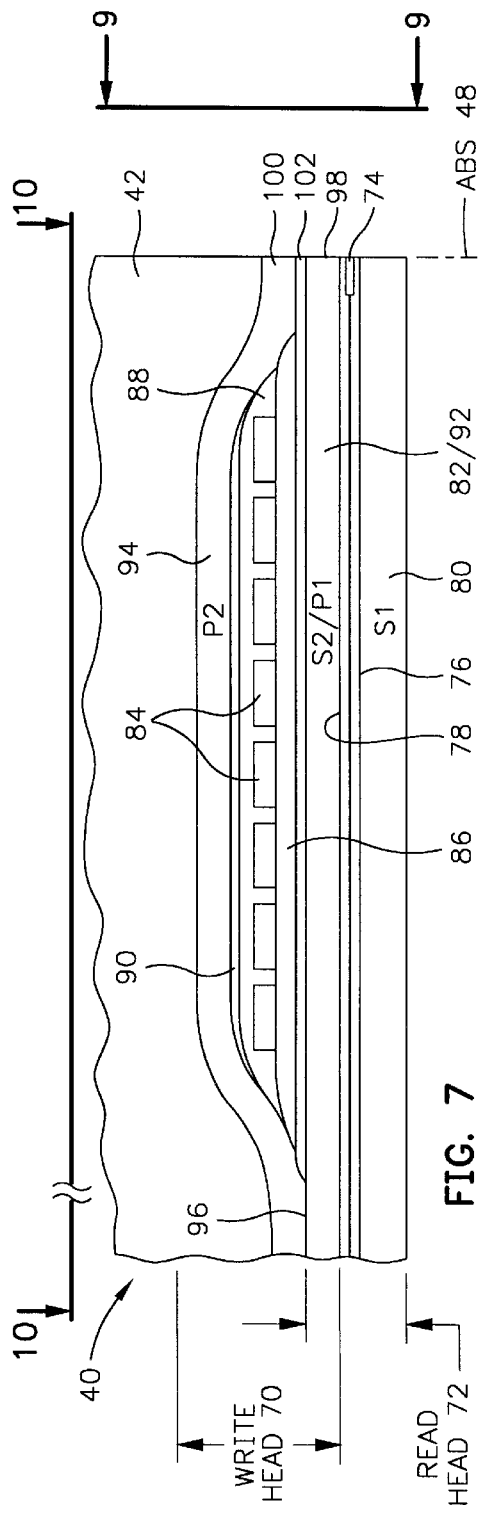

(ABS)

SPIN VALVE SENSOR HAVING FREE LAYER STABILIZED BY FERROMAGNETIC AND SENSE CURRENT FIELDS

BACKGROUND OF THE INVENTION

1. Field of the Invention

The present invention relates to a spin valve sensor having a free layer stabilized by ferromagnetic and sense current fields and, more particularly, to a ferromagnetic coupling field that has a horizontal component for strengthening longitudinal biasing of the free layer and a sense current field that is in the same direction as a vertical component of the ferromagnetic coupling field for strengthening transverse biasing of the free layer.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head may include a coil layer embedded in first, second and third insulation layers (insulation stack) with the insulation stack, in turn, being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is typically pinned perpendicular to the air bearing surface (ABS) of the head and the magnetic moment of the free layer is typically oriented parallel to the ABS, but free to rotate in response to external magnetic fields from the rotating disk. The magnetization of the pinned layer is pinned by exchange coupling with an antiferromagnetic (AFM) pinning layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes of the sensor cause potential changes that are detected and processed as playback signals by the processing circuitry.

The spin valve sensor is characterized by a magnetoresistive (MR) coefficient that is substantially higher than the MR coefficient of an anisotropic magnetoresistive (AMR) sensor. MR coefficient is dr/R were dr is the change in resistance of the spin valve sensor and R is the resistance of the spin valve sensor before the change. A spin valve sensor is sometimes referred to as a giant magnetoresistive (GMR) sensor. A spin valve is also known as a top or bottom spin valve depending upon whether the AFM pinning layer is at the top (AFM layer formed after the free layer) or at the bottom (AFM layer formed before the free layer). A pinning AFM layer in a bottom spin valve is typically made of nickel oxide (NiO). The spin valve sensor is located between first and second nonmagnetic electrically insulative read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

The signal performance of the spin valve sensor is poor unless the free layer is magnetically stabilized. The free layer is magnetically stabilized when its magnetic spins are in a single magnetic domain state. The free layer is not magnetically stabilized when the magnetic spins are oriented in multiple magnetic domains. Magnetic domains have domain walls which move when the free layer is subjected to an applied field. This movement causes unpredictable magnetic fields within the free layer which is superimposed upon the read signal from the rotating disk. Accordingly, the desired read signal is contaminated by internal magnetic signals within the free layer due to movement of the domain walls.

In order to overcome the instability of the free layer hard biasing layers are typically employed at side edges of the free layer for longitudinally magnetically biasing the free layer parallel to the ABS. First and second hard biasing layers may make contiguous junctions with first and second side edges of the spin valve sensor or first and second hard bias layers may overlap first and second layer portions of the spin valve sensor in passive regions of the sensor. As stated hereinabove, the spin valve sensor is located between first and second read gap layers. It is important that these read gap layers be extremely thin in order to promote linear bit read density of the read head. Linear bit density is determined by the distance between the first and second shield layers and is the length of the signal along the circular track of the rotating disk that the read head is capable of sensing. This length is reduced when the thicknesses of the first and second read gap layers is reduced thereby increasing the number of magnetic bits that the read head is capable of reading along the circular track which is referred to in the art as the aforementioned linear bit read density of the read head.

Unfortunately, when the first and second read gap layers are thin the longitudinal biasing field from the hard biasing layers quickly decays due to leakage to the first and second shield layers. While longitudinal biasing typically exists at the first and second side edges of the spin valve sensor, it progressively decays toward the center of the spin valve sensor where it may drop to zero. Accordingly, there is no or little longitudinal biasing at a center portion of the spin valve sensor. It has been found that a mere increase in the strength of the hard biasing layers does not overcome this problem. While the problem can be reduced by increasing the thickness of the first and second gap layers, this will reduce the linear bit read density of the read head which equates to reducing the magnetic storage capability of the magnetic disk drive. Accordingly, there is a strong-felt need for overcoming the magnetic instability of the free layer while maintaining high linear read bit density.

SUMMARY OF THE INVENTION

The present invention provides supplemental longitudinal biasing of the free layer for improving magnetic stability of the free layer in high linear bit read density read heads. This is accomplished by orienting the magnetic moment of the pinned layer at a slight angle θ to a normal to the air bearing surface. The angled magnetic moment of the pinned layer, in turn, exerts a correspondingly angled ferromagnetic coupling field on the free layer. The angled ferromagnetic coupling field on the free layer has a small horizontal ferromagnetic coupling field which is equal to $H_{FC} \sin \theta$. It is important that the pinned layer be pinned in a direction so that the horizontal component of the ferromagnetic coupling field is in the same direction as the hard biasing field on the free layer. It is also important that the angle θ be small, less than 10° and preferably less than 5°, since this angle reduces the vertical component of the magnetic moment of the pinned layer which is necessary for obtaining a desired read signal response. The horizontal component of the ferromagnetic coupling field on the free layer is highly effective in overcoming the decay problem of the hard biasing field since the horizontal component is constant throughout the entire width of the free layer.

Another aspect of the invention is improving the magnetic stability of the free layer with proper orientation of the sense current field. When the aforementioned first and second lead layers conduct a sense current through the spin valve sensor the sense current through the layers other than the free layer cause a net sense current field on the free layer which is transverse to the air bearing surface. The sense current field is zero at the top and bottom edges of the free layer and increases to a maximum at the center of the free layer between its top and bottom edges. The top and bottom edges of the sensor define the stripe height of the sensor. The ferromagnetic coupling field on the free layer is constant between its top and bottom edges. When the sense current field is oriented opposite to the direction of the ferromagnetic coupling field a net transverse field exists at the first and second side edges of the free layer, but can decrease to zero or go to an opposite polarity at the center of the stripe height. I have found that by conducting the sense current in an opposite direction that the net sense current field on the free layer is in the same direction as the ferromagnetic coupling field on the free layer so that the ferromagnetic coupling field and the net sense current field are additive. The additive effect of the ferromagnetic coupling field and the sense current field maintains a transverse biasing field on the free layer that increases from the top and bottom edges of the free layer toward the center of the stripe height for magnetically stabilizing the free layer.

In a preferred embodiment both of the foregoing aspects of the invention are combined to magnetically stabilize the free layer. Accordingly, the magnetic moment of the pinned layer is angled to provide a horizontal component of the ferromagnetic coupling field on the free layer to support the hard biasing of the free layer in combination with a sense current field that is appropriately directed to support the vertical component of the ferromagnetic coupling field on the free layer.

An object of the present invention is to magnetically stabilize a free layer of a spin valve sensor in high bit density read heads.

Another object is to provide a supplemental magnetic field or magnetic fields on the free layer in addition to a longitudinal biasing field for magnetically stabilizing the free layer.

A further object is to maintain the free layer in a single magnetic domain state in a magnetic read head that has minimally thick first and second read gap layers.

Another object is to employ a ferromagnetic coupling field on the free layer which has a component in the same direction as a magnetic field from hard biasing layers for magnetically stabilizing the free layer.

Still a further object is to transversely bias the free layer perpendicular to the air bearing surface for supplementing a ferromagnetic coupling field on the free layer so as to improve the magnetic stability of the free layer.

Still a further object is to orient a horizontal component of a ferromagnetic coupling field on the free layer in the same direction as longitudinal biasing by first and second hard biasing layers and employ a sense current field on the free layer which is in the same direction as a vertical component of the ferromagnetic coupling field for enhancing magnetic stability of the free layer.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
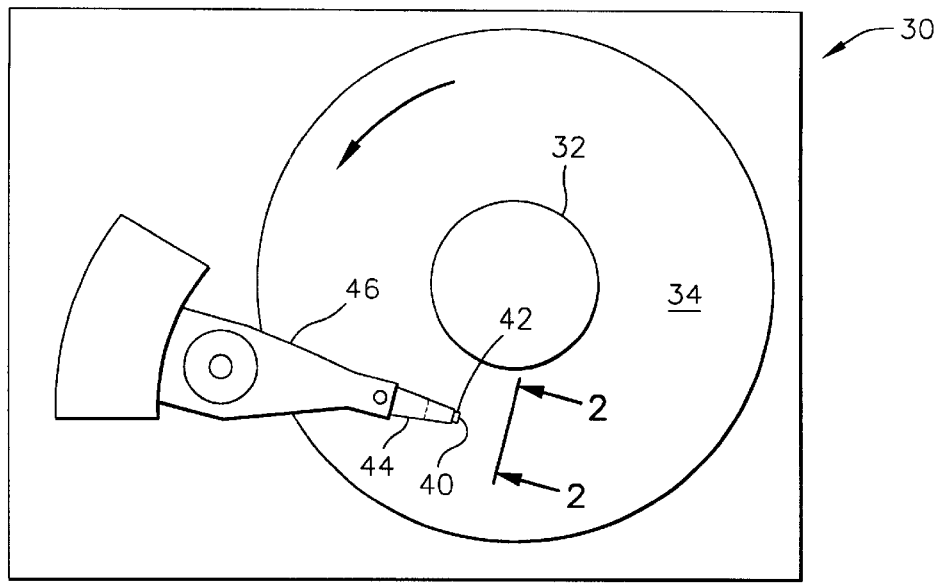
FIG. 1 is a planar view of an exemplary magnetic disk drive.
Figure 2:
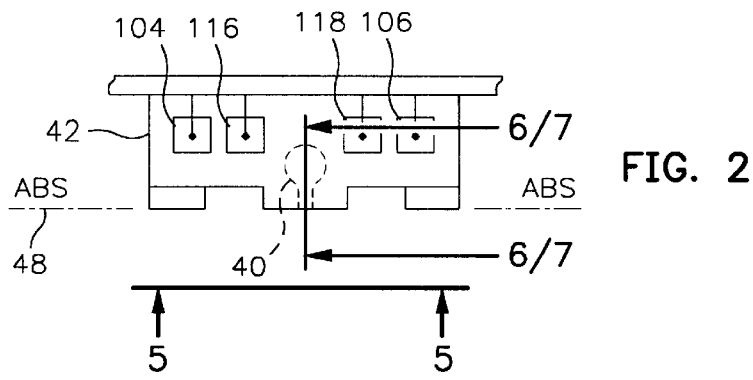
FIG. 2 is an end view of a slider with a magnetic head of the disk drive as seen in plane 2—2.
Figure 3:
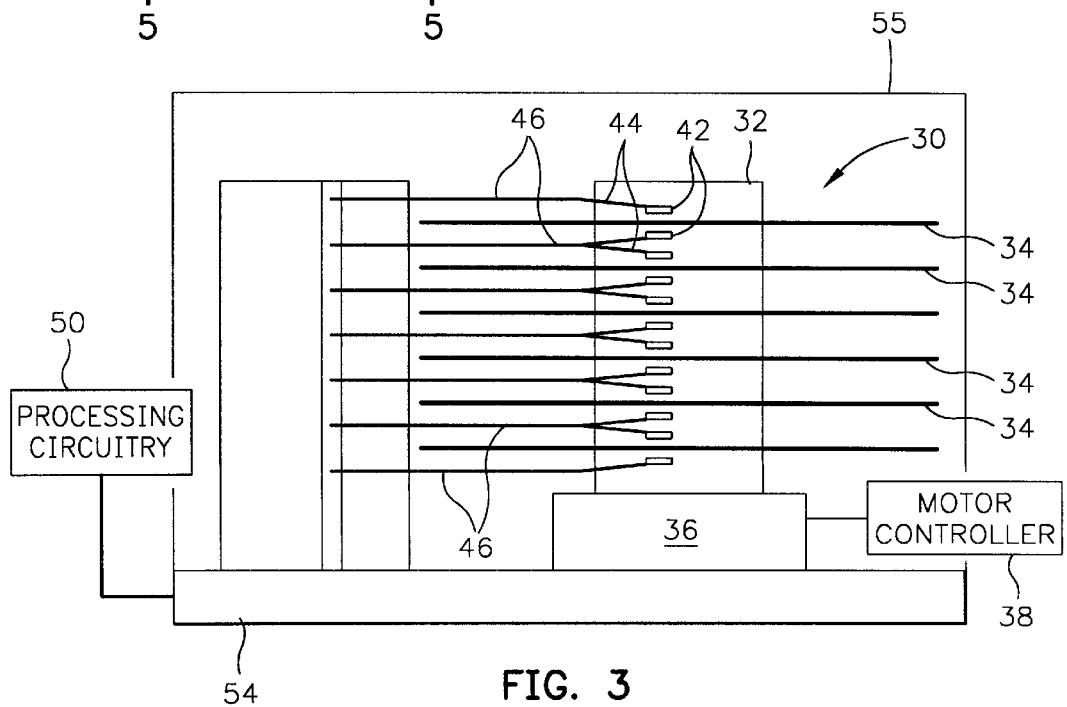
FIG. 3 is an elevation view of the magnetic disk drive wherein multiple disks and magnetic heads are employed.
Figure 4:
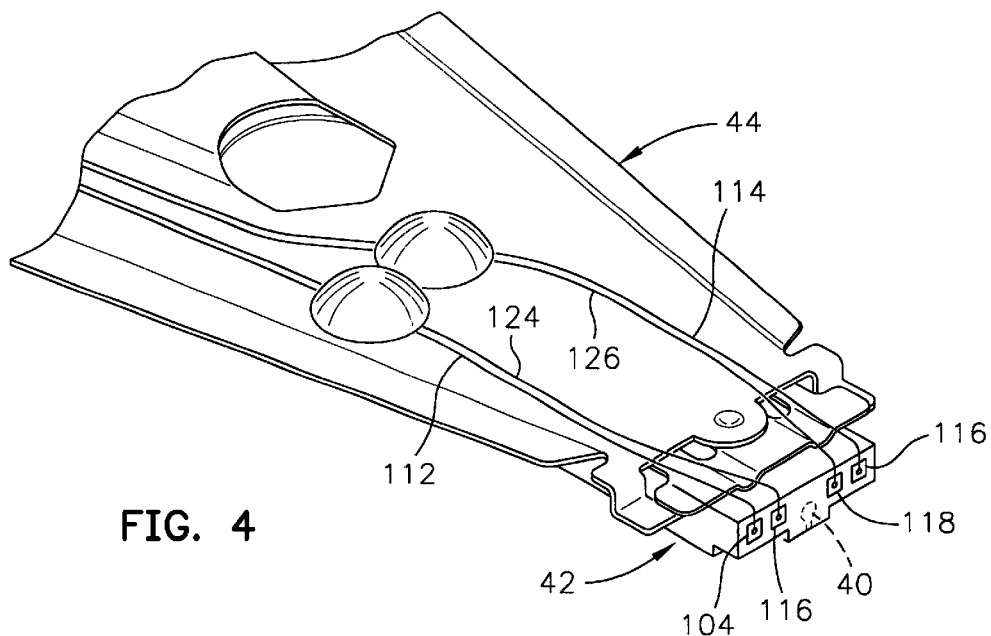
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
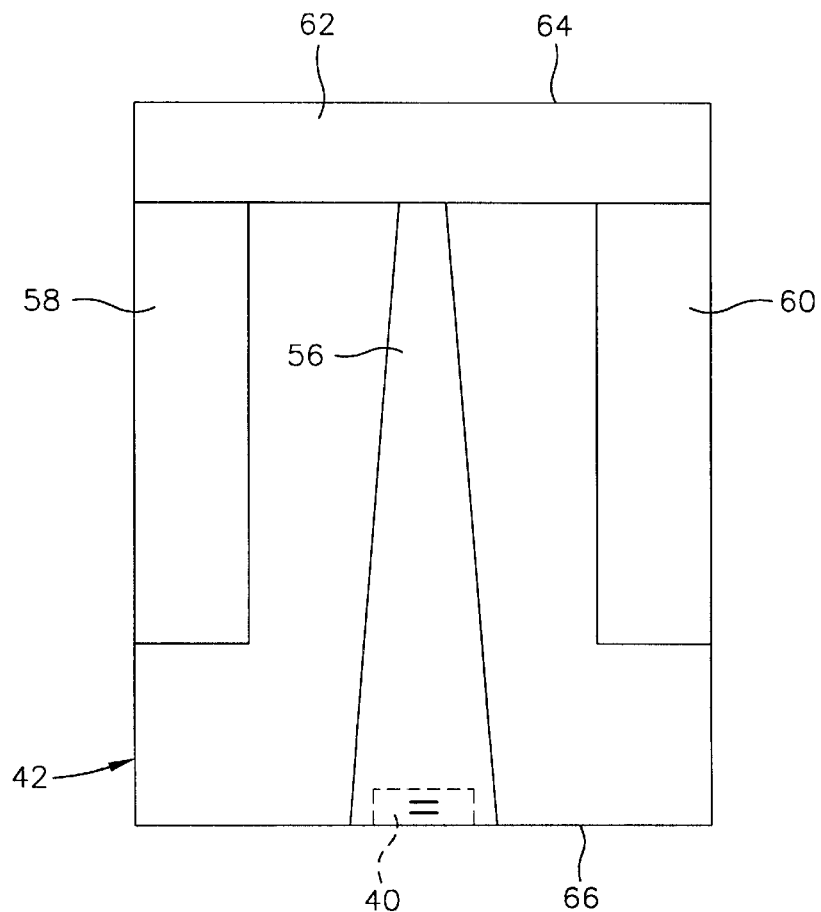
FIG. 5 is an ABS view of the magnetic head taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
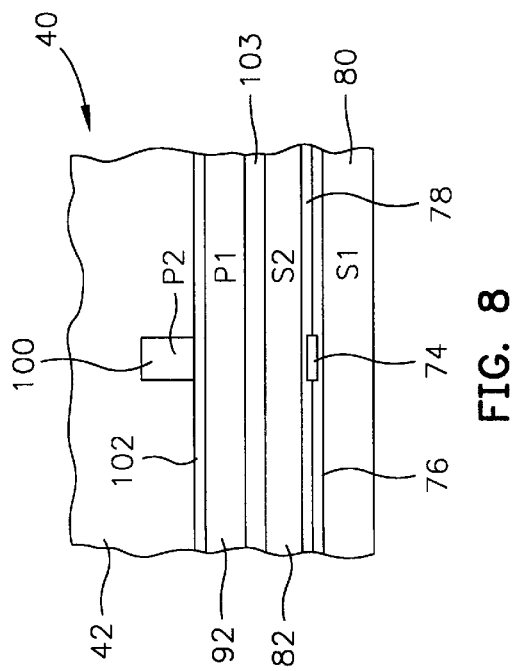
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
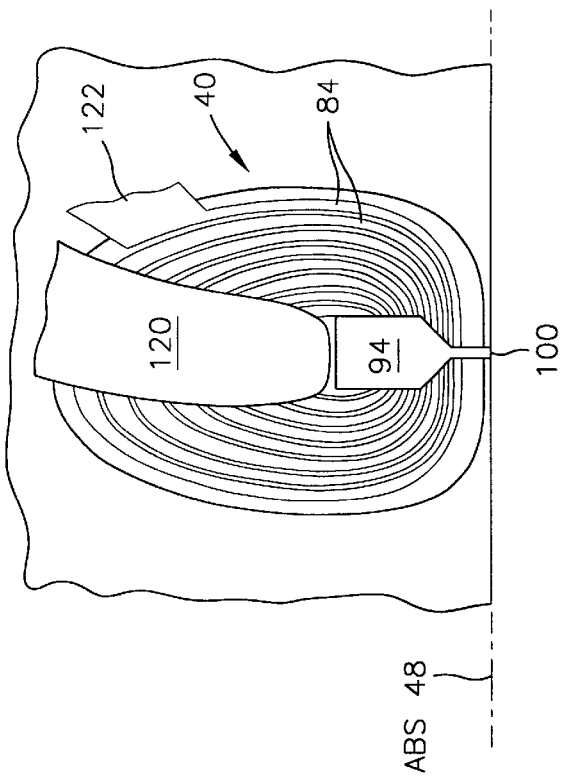
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
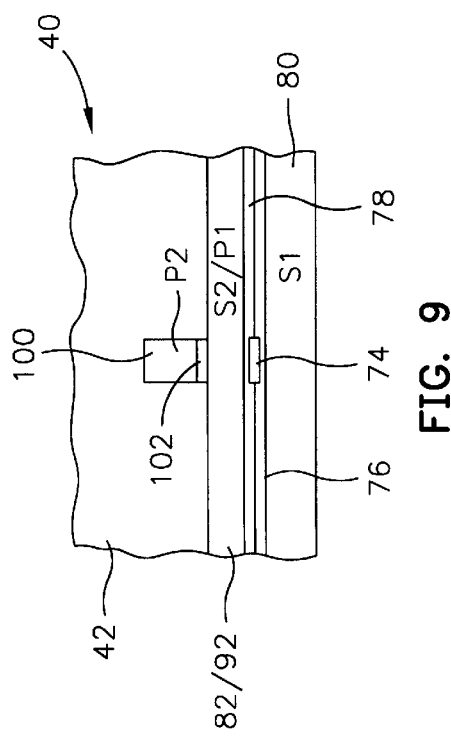
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
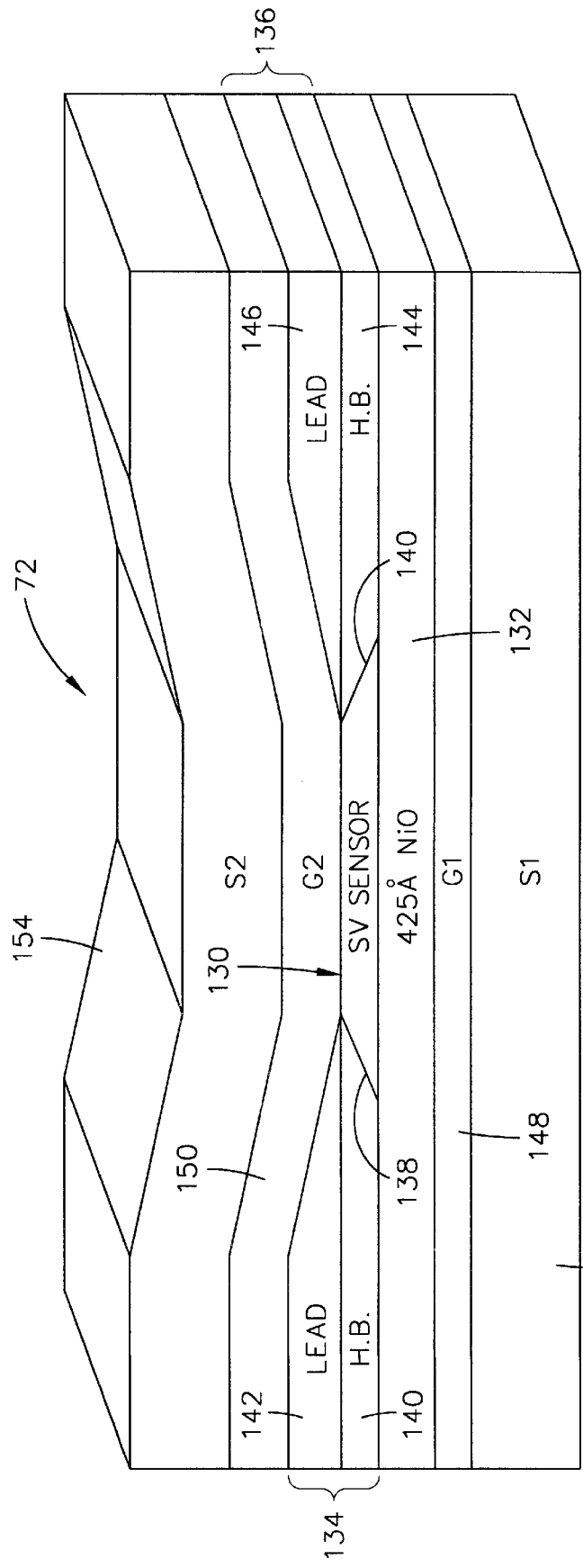
FIG. 11 is an isometric ABS illustration of a read head which employs a spin valve (SV) sensor.

FIG. 11 is an isometric ABS illustration of the read head 72 shown in FIG. 8. The read head 72 has a spin valve sensor 130 which is located on an antiferromagnetic (AFM) pinning layer 132. The spin valve 130 has a pinned layer, to be described hereinafter, that has its magnetic moment pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a hard bias layer 144 and a lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second gap layers 148 and 150. The first and second gap layers 148 and 150 are, in turn, located between first and second shield layers 152 and 154.

Figure 12:
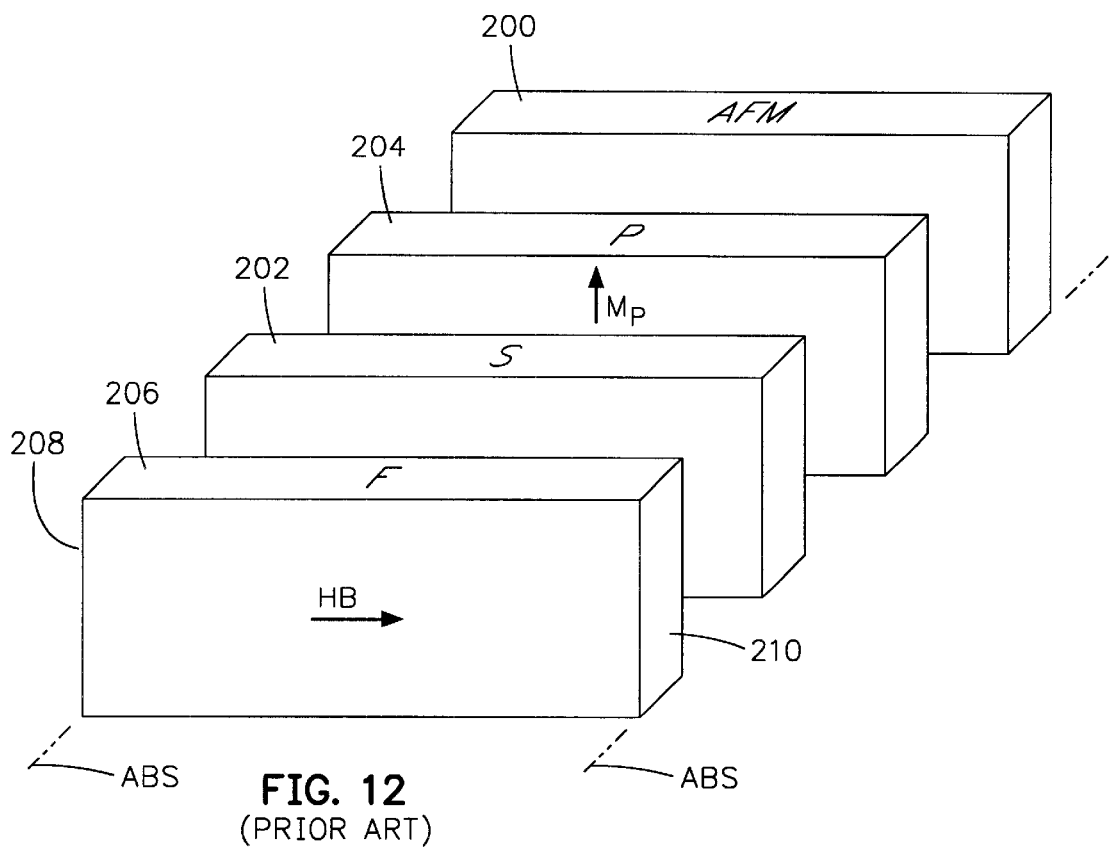
FIG. 12 is a schematic isometric illustration of various layers of a prior art spin valve sensor with a magnetic moment ($M_P$) oriented parallel to a normal to the ABS.
Figure 13:
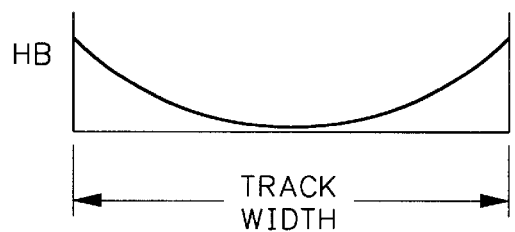
FIG. 13 is a prior art graph of the decay of a longitudinal biasing field on the free layer (F) exerted by first and second hard biasing layers (not shown)

FIG. 12 is an isometric schematic illustration of some of the layers of the spin valve sensor 130 (FIG. 11) along with an antiferromagnetic (AFM) layer 200, such as the AFM layer 132 in FIG. 11. The spin valve sensor includes a nonmagnetic electrically conductive spacer layer (S) 202 located between a ferromagnetic pinned layer (P) 204 and a ferromagnetic free layer (F) 206. For illustrative purposes, the magnetic moment $M_P$ of the pinned layer 204 is directed perpendicular to, and away from, the ABS and longitudinal hard biasing (HB) of the free layer is directed from left to right by the hard biasing layers 140 and 144 in FIG. 11. In a high linear bit density read head, the first and second gap layers 148 and 150 in FIG. 11 are minimally thin to a point of reasonable assurance that the lead layers 142 and 146 will not short past the first and second gap layers to the first and second shield layers 152 and 154. Unfortunately, the extreme thinness of the first and second gap layers 148 and 150 causes the longitudinal hard biasing field (HB) in the free layer 206 to leak to the first and second shield layers 152 and 154. This causes a decay in the longitudinal hard biasing field from a maximum at first and second side edges 208 and 210 of the free layer 206 to a middle of the track width of the free layer, as shown in FIG. 13. Accordingly, the longitudinal hard biasing field at the center portion of the track width of the free layer 206 is ineffective in magnetically stabilizing the free layer for promoting read signal symmetry. Accordingly, there is a strong-felt need for providing an additional scheme for stabilizing a free layer in a read head that has high linear bit read density.

The Invention

Figure 14:
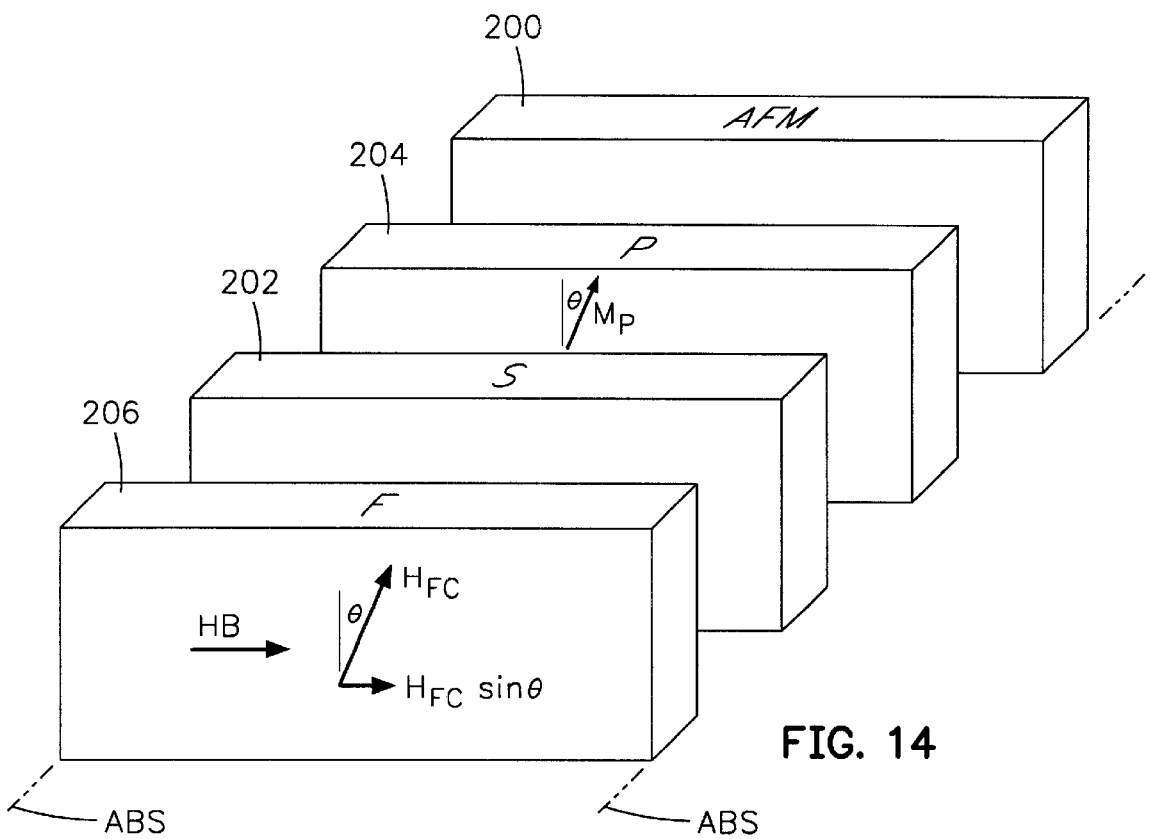
FIG. 14 is the same as FIG. 12 except the magnetic moment ($M_P$) of the pinned layer (P) is at an angle θ to a normal to the ABS.
Figure 15:
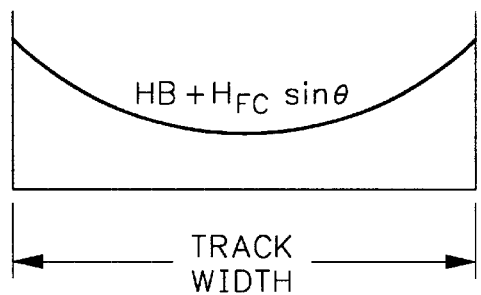
FIG. 15 is a graph of the combination of the horizontal biasing field in combination with a horizontal component of a ferromagnetic coupling field on the free layer of FIG. 14.

One aspect of the invention is illustrated in FIGS. 14 and 15. FIG. 14 is the same as FIG. 12 except the magnetic moment $M_P$ of the pinned layer 204 is at an angle θ to a normal to the ABS. This causes a ferromagnetic coupling field $H_{FC}$ at the same angle θ to the normal to the ABS. The ferromagnetic coupling field $H_{FC}$ that has horizontal and vertical components, the horizontal component of the ferromagnetic coupling field being equal to $H_{FC}$ sin θ. The invention orients the magnetic moment $M_P$ of the pinned layer 204 in a direction which causes the horizontal component of the ferromagnetic coupling field $H_{FC}$ sin θ to be in the same direction as the longitudinal hard biasing field HB for the purpose of supporting longitudinal biasing of the free layer 206. With this arrangement the longitudinal hard biasing field HB and the horizontal component of the ferromagnetic coupling field $H_{FC}$ sin θ are additive along the track width of the free layer 206 so as to maintain sufficient longitudinal biasing to stabilize the free layer. With this arrangement, the center portion of the track width is now magnetically stable as contrasted to the magnetic instability of a center portion of the track width of the free layer shown in FIG. 13. It should be noted that the horizontal component of the ferromagnetic coupling field $H_{FC}$ sin θ does not decay along the track width of the free layer since it is applied along the entire track width of the free layer as contrasted to the hard biasing field applied at the first and second ends 208 and 210 (FIG. 12) by the hard biasing layers 140 and 144 (FIG. 11). It is important that the angle θ be small so as not to unduly diminish the vertical component of the ferromagnetic coupling field $H_{FC}$ cos θ which is perpendicular to the ABS. The angle θ should be less than 10° and is preferably less than 5°. In a still further preferred embodiment the angle θ is 2°–3° from a normal to the ABS. The magnetic moment $M_P$ of the pinned layer 204 is pinned in the desired direction by the pinning layer 200.

Figure 16:
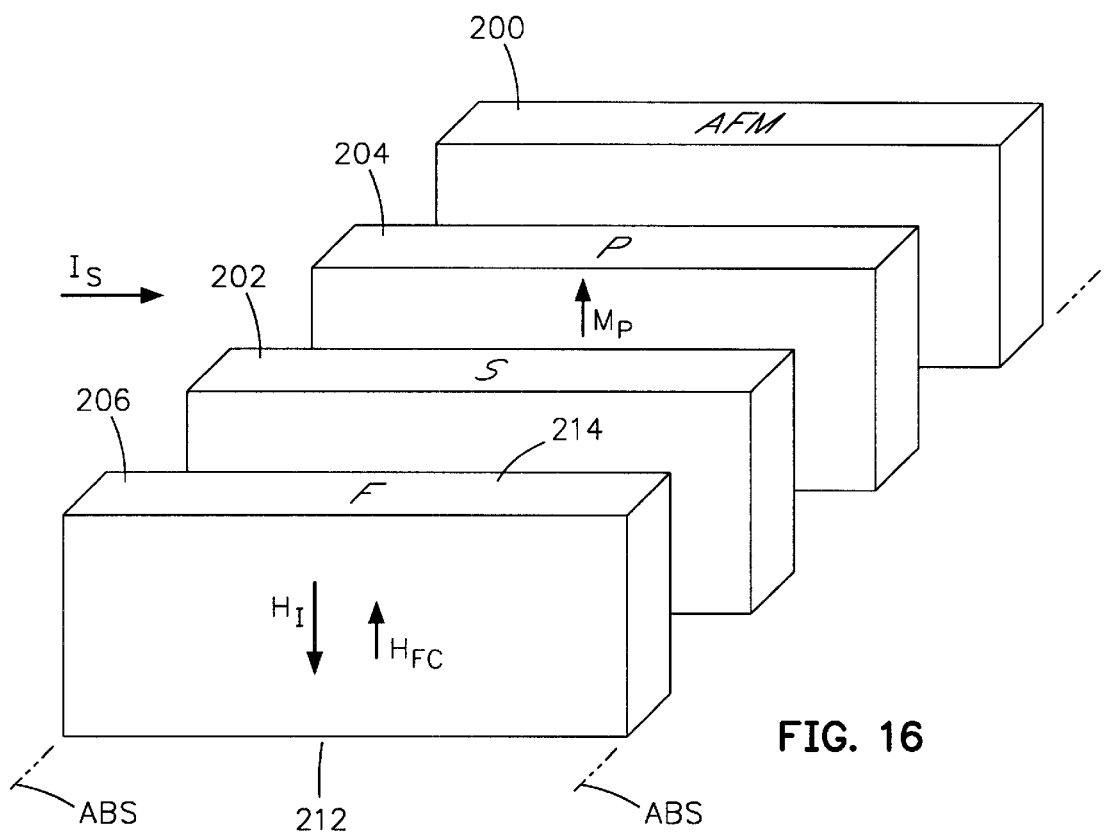
FIG. 16 is an isometric illustration of various layers of a spin valve sensor with a sense current ($I_S$) directed from left to right.
Figure 17A:
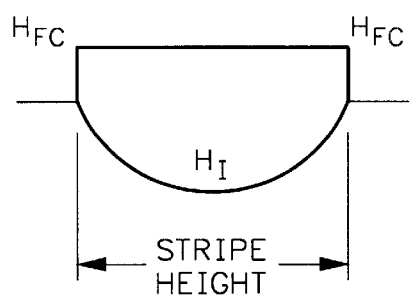
FIG. 17A is a graph of ferromagnetic and sense current fields along the stripe height of the free layer (F) of FIG. 16.
Figure 17B:
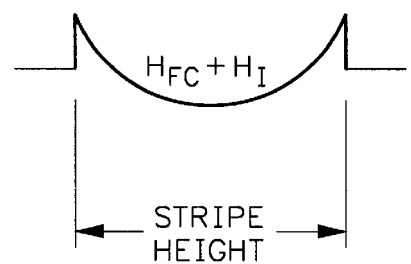
FIG. 17B is a graph of a combination of the ferromagnetic and sense current fields along the stripe height of the free layer of FIG. 16.

FIGS. 16, 17A and 17B illustrate background for another aspect of the present invention. FIG. 16 shows an isometric schematic illustration which is the same as FIG. 14 except the magnetic moment $M_P$ of the pinned layer 204 and the ferromagnetic coupling field $H_{FC}$ exerted on the free layer 206 are perpendicular to the ABS, a sense current $I_S$ is shown from left to right and a sense current field $H_I$ is exerted on the free layer 206 downward and perpendicular to the ABS. FIG. 17A is a graph of the ferromagnetic coupling field $H_{FC}$ and the sense current field $H_I$ from a bottom end 212 to a top end 214 of the free layer which defines the boundaries of the stripe height of the free layer. From FIG. 17A it can be seen that the ferromagnetic coupling field $H_{FC}$ is constant in a positive direction along the stripe height while the sense current field $H_I$ increases in a negative direction from the bottom and top ends 212 and 214 to a maximum at a center of the stripe height. FIG. 17B shows a combination of the ferromagnetic coupling field $H_{FC}$ and the sense current field $H_I$ which results in a maximum transverse field at the bottom and top ends 212 and 214 of the free layer which decreases toward the center of the stripe height. The decrease in the net transverse field on the free layer at a center portion of the stripe height reduces the magnetic stability of the free layer.

Figure 18:
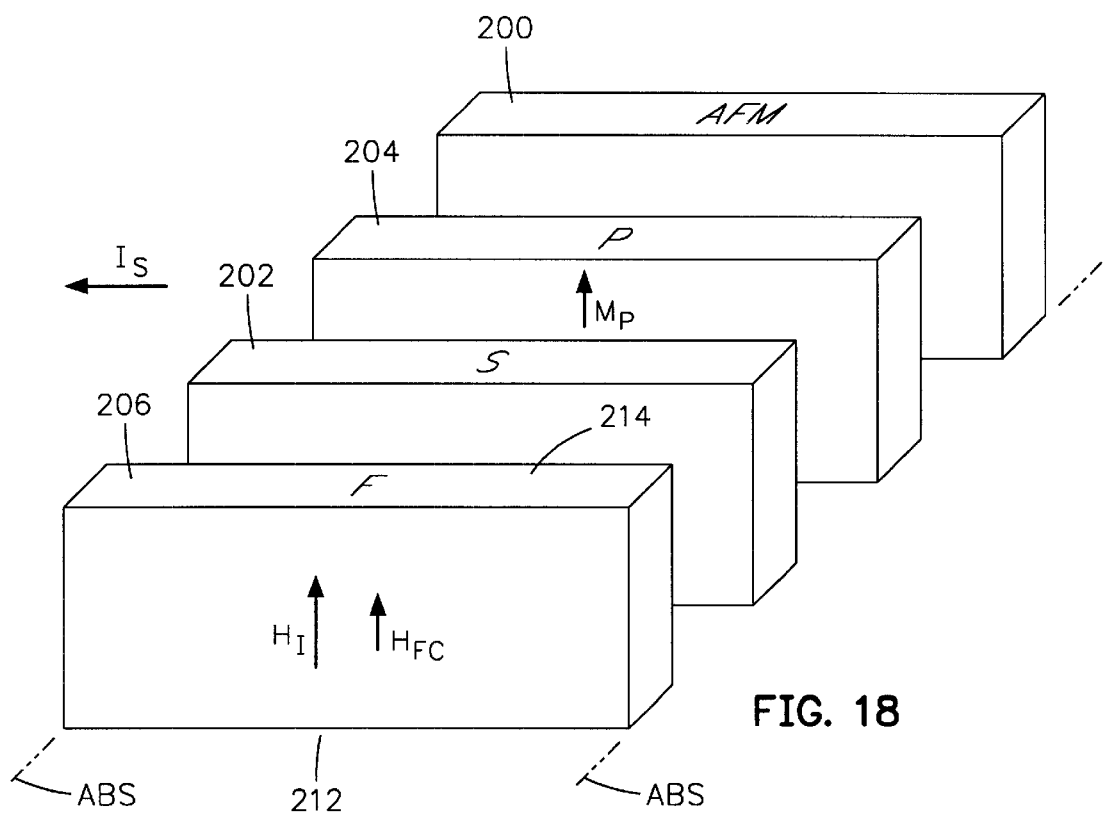
FIG. 18 is the same as FIG. 16 except the sense current ($I_S$) is directed from right to left.
Figure 19A:
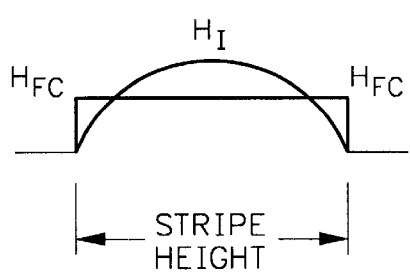
FIG. 19A is a graph of the ferromagnetic and sense current fields along the stripe height of the free layer (F) in FIG. 18.
Figure 19B:
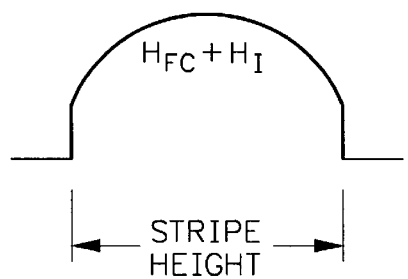
FIG. 19B is a combination of the ferromagnetic and sense current fields on the free layer of FIG. 18.

FIGS. 18, 19A and 19B show a second aspect of the present invention. FIG. 18 is the same as FIG. 16 except the sense current field $H_I$ is directed upwardly and away from the ABS instead of downwardly and toward the ABS as shown in FIG. 16. A ferromagnetic coupling field $H_{FC}$ and the sense current field $H_I$ are shown from the bottom end 212 to the top end 214 of the free layer in FIG. 19A. It can be seen from FIG. 19A that the ferromagnetic coupling field $H_{FC}$ and the sense current field $H_I$ have the same polarity. FIG. 19B shows a combination of the ferromagnetic coupling field $H_{FC}$ and the sense current field $H_I$ which provides an improved transverse field for magnetically stabilizing the free layer 214.

Figure 20:
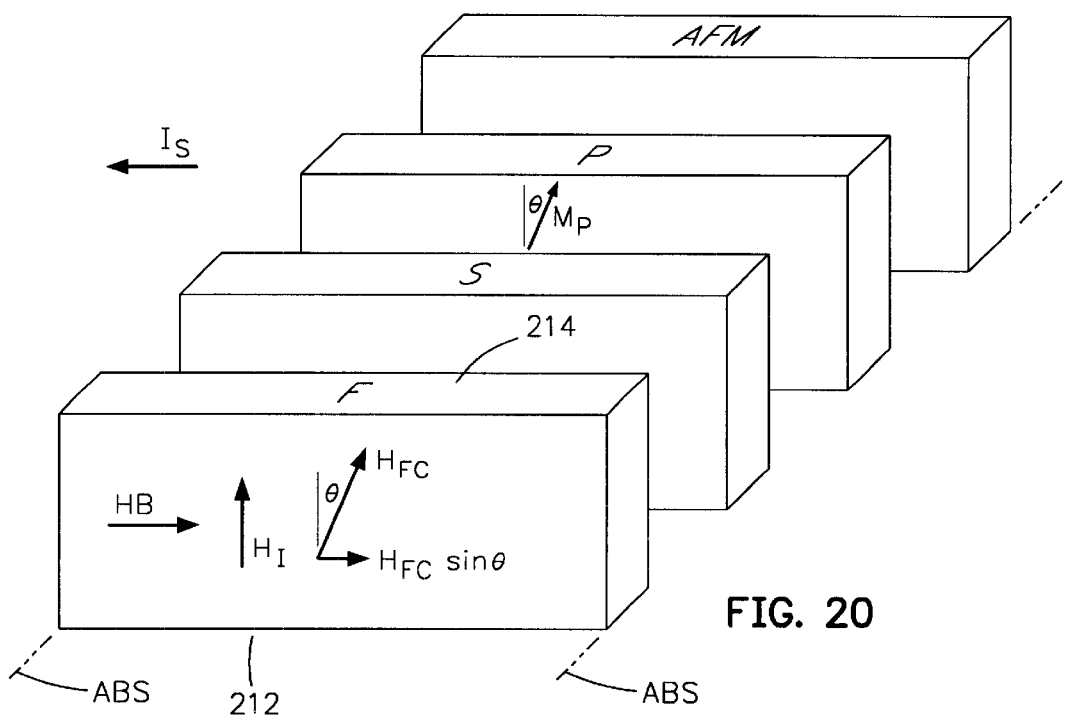
FIG. 20 is the same as FIG. 18 except the ferromagnetic coupling field ($H_{FC}$) on the free layer is at an angle θ to a normal to the ABS.
Figure 21A:
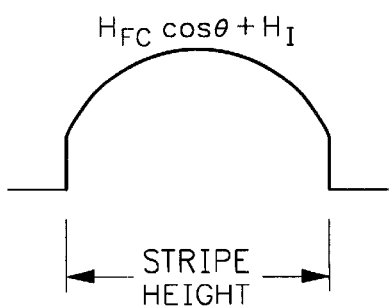
FIG. 21A is graph showing a combination of the horizontal component of the ferromagnetic coupling field and the sense current field on the free layer in FIG. 20.
Figure 21B:
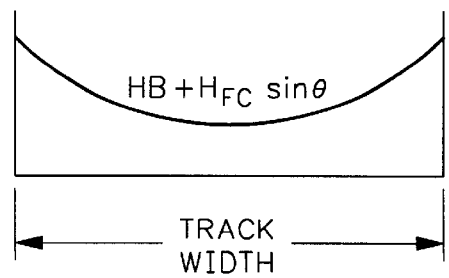
FIG. 21B is a combination of the hard bias field and a horizontal component of the ferromagnetic coupling field along the track width of the free layer of FIG. 20.

FIGS. 20, 21A and 21B illustrate a third aspect of the present invention. FIG. 20 is the same as FIG. 14 except the features of FIG. 18 have been incorporated therein. Similar to FIG. 14, a horizontal component of the ferromagnetic coupling field $H_{FC}$ sin θ is provided in the same direction as the longitudinal hard biasing field HB and, similar to FIG. 18, the sense current $I_s$ is directed from right to left so as to exert a sense current field $H_I$ which is directed upwardly and away from the ABS. A combination of the horizontal component of the ferromagnetic coupling field $H_{FC}$ sin θ and the longitudinal hard biasing field HB from the bottom end 212 to the top end 214 of the free layer is shown in FIG. 21A.

Accordingly, a transverse field which increases between the ends 212 and 214 of the free layer toward the center of the stripe height of the sensor provides a desirable net transverse field for promoting magnetic stability of the free layer. Further, the combination of the longitudinal hard biasing field HB and the horizontal component of the ferromagnetic coupling field $H_{FC}$ sin θ combine to provide an increased longitudinal field along the entire track width of the free layer so as to further promote magnetic stability there along of the free layer 214.

Figure 22:
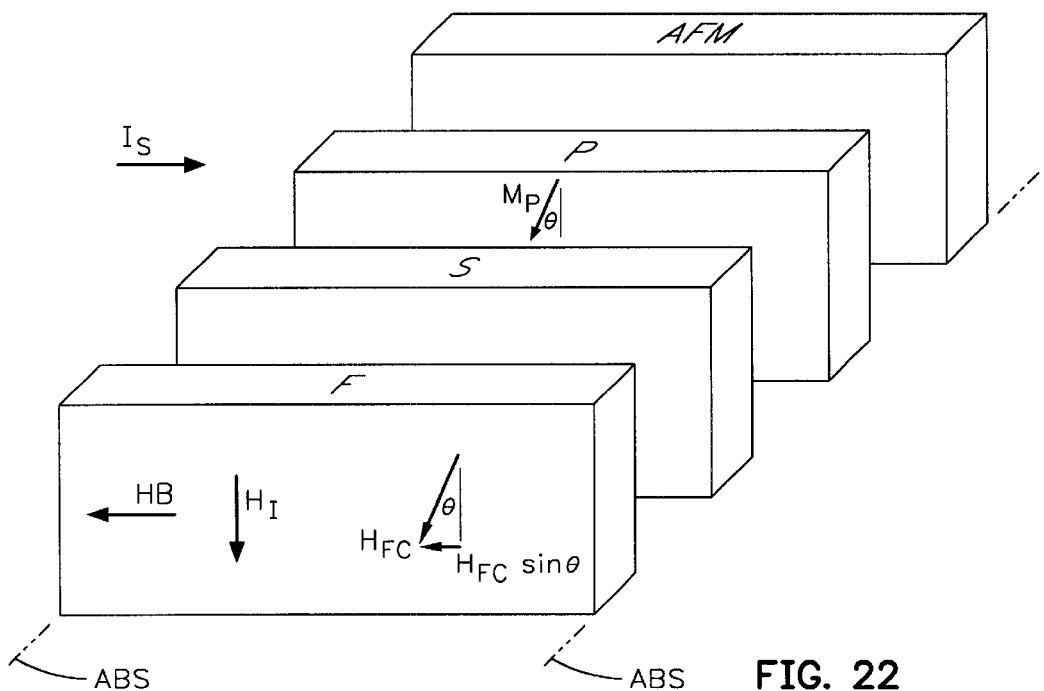
FIG. 22 is the same as FIG. 20 except the directions of the sense current ($I_S$), the sense current field ($H_I$), the hard biasing field (HB) and the ferromagnetic coupling field ($H_{FC}$) are reversed.
Figure 23A:
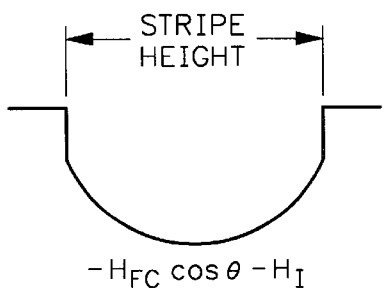
FIG. 23A is a graph of a combination of the ferromagnetic coupling and sense current fields.
Figure 23B:
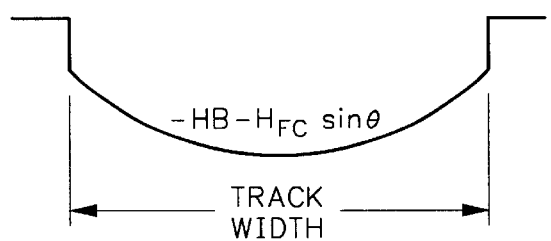
FIG. 23B is a combination of the hard biasing field and a horizontal component of the ferromagnetic coupling field.

FIGS. 22, 23A and 23B illustrate the same invention as illustrated in FIGS. 20, 21A and 21B except directions of the magnetic moment $M_P$, the ferromagnetic coupling field $H_{FC}$, the longitudinal hard biasing field HB, the sense current $I_S$ and the sense current field $H_I$ are reversed. The graph in FIG. 23A is the same as the graph in FIG. 21A except the polarity of the combination of the ferromagnetic coupling field $H_{FC}$ and the sense current field $H_I$ is reversed. The graph in FIG. 23B is the same as the graph in FIG. 21B except the polarity of the combination of the longitudinal hard biasing field HB and the horizontal component of the ferromagnetic coupling field $H_{FC}$ sin θ is reversed. FIGS. 20 and 22 are exemplary directions of the magnetic moments, ferromagnetic coupling fields, longitudinal hard biasing fields HB, sense current $I_s$ and sense current field $H_I$ for exemplary top and bottom heads on sliders 220 and 222 respectively in FIG. 3.

Figure 24:
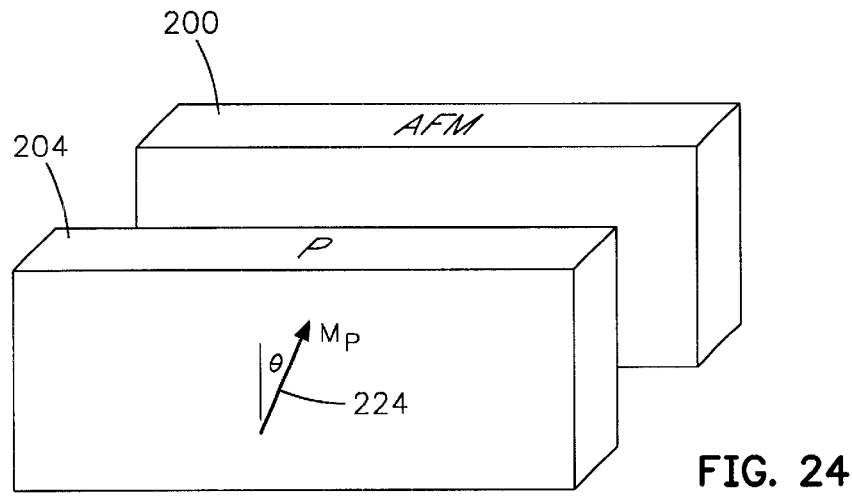
FIG. 24 is an isometric illustration of two layers of a spin valve sensor for a simple spin valve.
Figure 25:
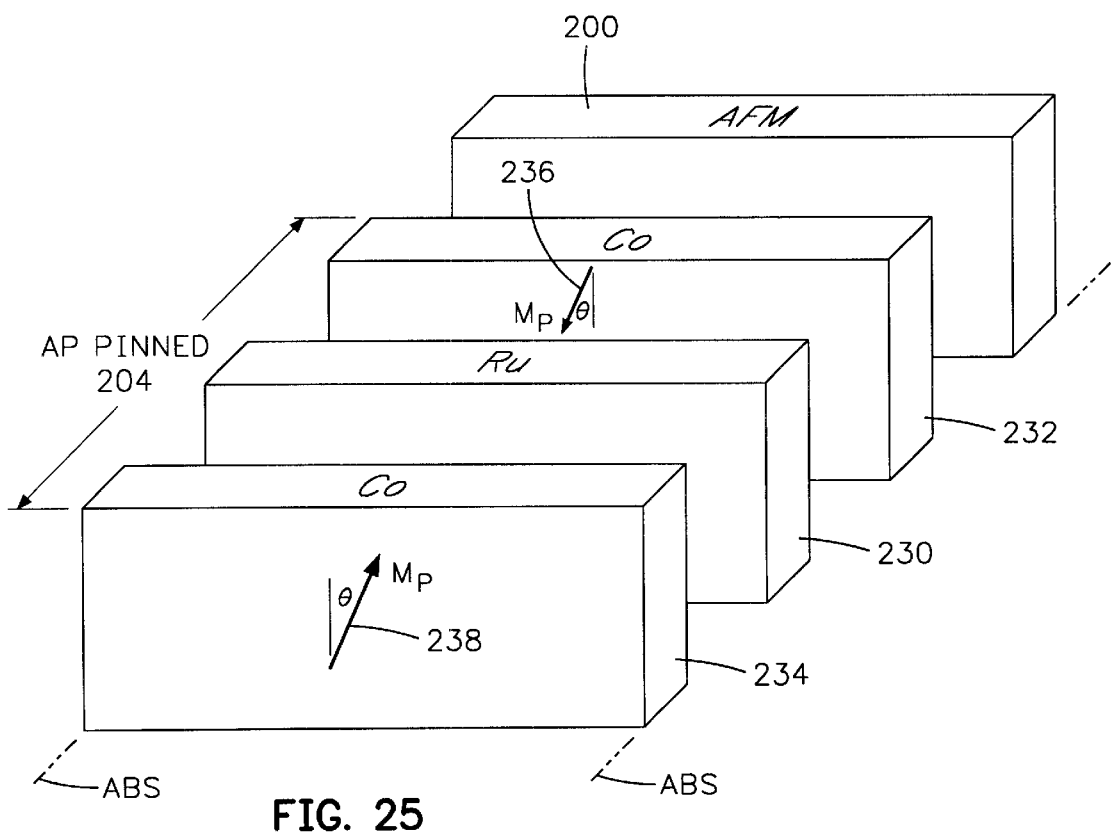
FIG. 25 is an isometric illustration of some of the layers of a spin valve sensor which employs an antiparallel (AP) pinned layer.

FIG. 24 illustrates the pinned layer 204 and the pinning layer (AFM) 200 of a simple spin valve sensor. It should be understood that the pinned layer 204 in FIG. 24 may alternatively be an antiparallel pinned layer 204 as shown in FIG. 25. An AP pinned layer 204 includes an antiparallel coupling film 230 which is located between first and second ferromagnetic films 232 and 234. The magnetic moment 236 of the first film 232 is pinned downwardly at an angle θ to a normal to the ABS while the magnetic moment 238 of the film 234 is pinned upwardly at the same angle θ to the normal to the ABS. Accordingly, the magnetic moment 238 is antiparallel to the magnetic moment 236 which is due to the extreme thinness of the antiparallel coupling layer 230 which is typically constructed of ruthenium (Ru). Accordingly, the magnetic moment 238 in FIG. 25 is equivalent to the magnetic moment 224 in FIG. 22 for reacting with a magnetic moment of the free layer of the spin valve sensor for producing a read signal. The AP pinned spin valve sensor is generally preferred since the thicknesses of the ferromagnetic layers 232 and 234 may be tailored to provide a desired pinning field and a reduction in demagnetization field on the free layer. When fields exerted on the free layer are excessive the magnetic moment of the free layer is stiffened so that it is harder for the signal from the rotating magnetic disk to rotate the magnetic moment of the free layer upwardly and downwardly for detecting the read signal.

It should be understood that a very small stabilizing field is required for stabilizing the free layer. This field may be in the order of 0.5 Oe to 1.0 Oe. Accordingly, only a small horizontal component of the ferromagnetic coupling field and/or transverse biasing field is required to implement stabilization of the free layer. It should further be understood that the spin valve may be either a top or a bottom type spin valve. A bottom spin valve is shown in FIG. 11 since the pinning layer 132 is constructed before the construction of the remainder of the layers of the spin valve. In a top spin valve the free layer, the spacer layer and the pinned layer are constructed first and the pinning layer is constructed on top of the pinned layer for pinning its magnetic moment.

Clearly other embodiments and modifications of this invention will readily occur to those of ordinary skill in the art upon reading these teachings. Therefore, this invention is to be limited only by the following claims, which include all such embodiments and modifications when viewed in conjunction with the above specification and accompanying drawings.

I claim:

1. A magnetic read head that has an air bearing surface (ABS) and a track width along the ABS comprising:
    a spin valve sensor, the spin valve sensor including:
        a ferromagnetic free layer bounded in part by top and bottom edges and first and second side edges wherein the bottom edge forms a portion of said ABS;
        a ferromagnetic pinned layer;
        a nonmagnetic electrically conductive spacer layer located between the free layer and the pinned layer;
        an antiferromagnetic pinning layer;
        the pinned layer being located between the pinning layer and the spacer layer and having its magnetic moment pinned by the pinning layer in a direction which is at an angle θ to a normal to said ABS so that the magnetic moment of the pinned layer causes a ferromagnetic coupling field ($H_{FC}$) on the free layer which is directed at said angle θ with vertical and horizontal ferromagnetic coupling field components on the free layer, the vertical component being equal to $H_{FC}$ cos θ and the horizontal component being equal to $H_{FC}$ sin θ;
        first and second hard bias layers magnetically coupled to the first and second edges respectively of the free layer for longitudinally biasing the free layer in a hard biasing direction that is parallel to the ABS and said track width; and
        said hard biasing direction and a direction of the horizontal component of the ferromagnetic coupling field being in the same direction.

2. A magnetic read head as claimed in claim 1 wherein the read head further includes:
    nonmagnetic electrically insulative first and second gap layers;
    the spin valve sensor and the first and second leads being located between the first and second gap layers;
    ferromagnetic first and second shield layers; and
    the first and second gap layers being located between the first and second shield layers.

3. A magnetic read head as claimed in claim 2 wherein θ is less than 5°.

4. A magnetic read head as claimed in claim 2 wherein θ is from substantially 2°–3°.

5. A magnetic read head as claimed in claim 1 wherein the pinned layer is an antiparallel (AP) pinned layer that comprises:
    first and second ferromagnetic pinned films with a magnetic moment of the first pinned film being pinned by the pinning layer in a direction;
    an AP coupling film located between the first and second pinned films so that a magnetic moment of the second pinned film is pinned antiparallel to said direction of the magnetic moment of the first pinned film; and
    the second ferromagnetic film exerting said ferromagnetic coupling field on the free layer.

6. A magnetic read head as claimed in claim 5 wherein the read head further includes:
    nonmagnetic electrically insulative first and second gap layers;
    the spin valve sensor and the first and second leads being located between the first and second gap layers;

ferromagnetic first and second shield layers; and the first and second gap layers being located between the first and second shield layers.

7. A magnetic read head as claimed in claim 6 wherein θ is less than 5°.

8. A magnetic read head as claimed in claim 6 wherein θ is from substantially 2°–3°.

9. A magnetic head that has a read head and a write head and an air bearing surface (ABS) and a track width along the ABS comprising:

the write head including:
first and second pole piece layers;
each of the first and second pole piece layer having a yoke portion located between a pole tip portion and a back gap portion;
a nonmagnetic electrically insulative write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and the read head having a spin valve sensor that includes:
a ferromagnetic free layer bounded in part by top and bottom edges and first and second side edges wherein the bottom edge forms a portion of said ABS;
a ferromagnetic pinned layer;
a nonmagnetic electrically conductive spacer layer located between the free layer and the pinned layer;
an antiferromagnetic pinning layer;
the pinned layer being located between the pinning layer and the spacer layer and having its magnetic moment pinned by the pinning layer in a direction which is at an angle θ to a normal to said ABS so that the magnetic moment of the pinned layer causes a ferromagnetic coupling field ($H_{FC}$) on the free layer which is directed at said angle θ with vertical and horizontal ferromagnetic coupling field components on the free layer, the vertical component being equal to $H_{FC}$ cos θ and the horizontal component being equal to $H_{FC}$ sin θ;
first and second hard bias layers magnetically coupled to the first and second edges respectively of the free layer for longitudinally biasing the free layer in a hard biasing direction that is parallel to the ABS and said track width; and
said hard biasing direction and a direction of the horizontal component of the ferromagnetic coupling field being in the same direction;

the read head further including:
nonmagnetic electrically insulative first and second gap layers;
the spin valve sensor and the first and second leads being located between the first and second gap layers;
ferromagnetic first and second shield layers; and
the first and second gap layers being located between the first and second shield layer and the first pole piece layer.

10. A magnetic head as claimed in claim 9 wherein the read head includes:
a ferromagnetic second shield layer;
the first and second read layers being located between the first and second shield layers; and
a nonmagnetic layer being located between the second shield layer and the first pole piece layer.

11. A magnetic head as claimed in claim 9 wherein the first pole piece layer functions as a second shield layer of the read head.

12. A magnetic head as claimed in claim 9 wherein θ is less than 5°.

13. A magnetic head as claimed in claim 9 wherein θ is from substantially 2–3°.

14. A magnetic head as claimed in claim 9 wherein the pinned layer is an antiparallel (AP) pinned layer that comprises:

first and second ferromagnetic pinned films with a magnetic moment of the first pinned film being pinned by the pinning layer in a direction;
an AP coupling film located between the first and second pinned films so that a magnetic moment of the second pinned film is pinned in another direction antiparallel to said direction of the magnetic moment of the first. pinned film; and
the second ferromagnetic film exerting said ferromagnetic coupling field on the free layer.

15. A magnetic head as claimed in claim 14 wherein θ is less than 5°.

16. A magnetic head as claimed in claim 14 wherein θ is from substantially 2°–3°.

17. A magnetic disk drive having at least one slider that has an air bearing surface (ABS), the slider supporting a read head and a write head, wherein the read head has a track width along the ABS that is defined by a width of a spin valve sensor, the disk drive comprising:

the read head including:
nonmagnetic electrically insulative first and second gap layers;
said spin valve sensor;
the spin valve sensor and the first and second leads being located between the first and second gap layers;
ferromagnetic first and second shield layers; and
the first and second gap layers being located between the first and second shield layers;

the spin valve sensor including:
a ferromagnetic free layer;
a ferromagnetic pinned layer that has a magnetic moment;
a nonmagnetic electrically conductive spacer layer located between the free layer and the pinned layer;
an antiferromagnetic pinning layer;
the pinned layer being located between the pinning layer and the spacer layer and having its magnetic moment pinned by the pinning layer in a first direction perpendicular to a normal to the ABS or in a second direction at an angle θ to said normal; and
the magnetic moment of the pinned layer causing a ferromagnetic coupling field on the free layer which is directed in the same direction as the magnetic moment of the pinned layer;

the write head having an ABS and including:
first and second pole piece layers;
each of the first and second pole piece layer having a yoke portion located between a pole tip portion and a back gap portion;
a nonmagnetic electrically insulative write gap layer located between the pole tip portions of the first and second pole piece layers;
an insulation stack with at least one coil layer embedded therein located between the yoke portions of the first and second pole piece layers; and the first and second pole piece layers being connected at their back gaps portions; and a housing;

a magnetic disk rotatably supported in the housing;

a support mounted in the housing for supporting the read and write heads with their air bearing surfaces facing the magnetic disk so that the read and write heads are in a transducing relationship with the magnetic disk;

means for rotating the magnetic disk;

positioning means connected to the support for moving the read and write heads to multiple positions with respect to said magnetic disk;

processing means, that includes a sense current generation device, further connected to the read and write heads and connected to the means for rotating the magnetic disk and to the positioning means for exchanging signals with the read and write heads for controlling movement of the magnetic disk and for controlling the position of the read and write heads; and the sense current generation device, including first and second leads connected to the spin valve sensor, for producing a sense current through the spin valve sensor that causes a net sense current field on the free layer that is directed in said first direction.

18. A magnetic disk drive as claimed in claim 17 including:

the free layer being bounded in part by top and bottom edges and first and second side edges wherein the bottom edge forms a portion of said ABS;

first and second hard bias layers magnetically coupled to the first and second edges respectively of the free layer for longitudinally biasing the free layer in a hard biasing direction that is parallel to the ABS;

the magnetic moment of the pinned layer being in said second direction which causes a horizontal component of the ferromagnetic coupling field to be exerted on the free layer; and said hard biasing direction and the horizontal component of the ferromagnetic coupling field being in the same direction.

19. A magnetic disk drive as claimed in claim 18 wherein θ is less than 5°.

20. A magnetic disk drive as claimed in claim 18 wherein θ is from substantially 2°–3°.

21. A magnetic disk drive as claimed in claim 18 wherein the pinned layer is an antiparallel (AP) pinned layer that comprises:

first and second ferromagnetic pinned films with a magnetic moment of the first pinned film being pinned by the pinning layer in a direction;

an AP coupling film located between the first and second pinned films so that a magnetic moment of the second pinned film is pinned antiparallel to said direction of the magnetic moment of the first pinned film; and the second ferromagnetic film exerting said ferromagnetic coupling field on the free layer.

22. A magnetic disk drive as claimed in claim 21 wherein θ is less than 5°.

23. A magnetic disk drive as claimed in claim 21 wherein θ is from substantially 2°–3°.

24. A method of making a magnetic read head that has an air bearing surface (ABS) site and a track width along the ABS site and a track width along the ABS site comprising in unordered sequence:

making a spin valve sensor as follows:

forming a ferromagnetic free layer that is bounded in part by top and bottom edges and first and second side edges wherein the bottom edge forms a portion of said ABS;

forming a ferromagnetic pinned layer;

forming a nonmagnetic electrically conductive spacer layer between the free layer and the pinned layer;

forming an antiferromagnetic pinning layer;

forming the pinned layer between the pinning layer and the spacer layer with a magnetic moment pinned by the pinning layer in a direction which is at an angle θ to a normal to said ABS so that the magnetic moment of the pinned layer causes a ferromagnetic coupling field ($H_{FC}$) on the free layer which is directed at said angle θ with a vertical component normal to the ABS equal to $H_{FC} \cos \theta$ and a horizontal component parallel to the ABS equal to $H_{FC} \sin \theta$; and forming first and second hard bias layers that are magnetically coupled the first and second edges respectively of the free layer for longitudinally biasing the free layer in a hard biasing direction that is parallel to the ABS and. the track width and in the same direction as the horizontal component of the ferromagnetic coupling field ($H_{FC}$).

25. A method as claimed in claim 24 wherein the making of the read head further includes:

making nonmagnetic electrically insulative first and second gap layers with the spin valve sensor and the first and second leads located therebetween; and forming ferromagnetic first and second shield layers with the first and second gap layers located therebetween.

26. A method as claimed in claim 25 wherein θ is less than 5°.

27. A method as claimed in claim 25 wherein θ is substantially 2°–3°.

28. A method as claimed in claim 24 wherein the pinned layer is made by:

forming first and second ferromagnetic pinned films with a magnetic moment of the first pinned film being pinned by the pinning layer in a direction; and forming an antiparallel (AP) coupling film between the first and second pinned films so that a magnetic moment of the second pinned film is pinned antiparallel to said direction of the magnetic moment of the first pinned film with the second ferromagnetic film exerting said ferromagnetic coupling field on the free layer.

29. A method as claimed in claim 28 wherein the making of the read head further includes:

making nonmagnetic electrically insulative first and second gap layers with the spin valve sensor and the first and second leads located therebetween; and forming ferromagnetic first and second shield layers with the first and second gap layers located therebetween.

30. A method as claimed in claim 29 wherein θ is less than 5°.

31. A method as claimed in claim 29 wherein θ is substantially 2°–3°.

32. A method of making a magnetic head that has a read head and a write head and an air bearing surface (ABS) site and a track width along the ABS site comprising in unordered sequence:

making the read head with a spin valve sensor, the making of the spin valve sensor including:

forming a ferromagnetic free layer that is bounded in part by top and bottom edges and first and second side edges wherein the bottom edge forms a portion of said ABS;

forming a ferromagnetic pinned layer;

forming a nonmagnetic electrically conductive spacer layer between the free layer and the pinned layer;

forming an antiferromagnetic pinning layer;

forming the pinned layer between the pinning layer and the spacer layer with a magnetic moment pinned by the pinning layer in a direction which is at an angle θ to a normal to said ABS so that the magnetic moment of the pinned layer causes a ferromagnetic coupling field ($H_{FC}$) on the free layer which is directed at said angle θ with a vertical component normal to the ABS equal to $H_{FC}$ cos θ and a horizontal component parallel to the ABS equal to $H_{FC}$ sin θ; and forming first and second hard bias layers that are magnetically coupled the first and second edges respectively of the free layer for longitudinally biasing the free layer in a hard biasing direction that is parallel to the ABS and in the same direction as the horizontal component of the ferromagnetic coupling field ($H_{FC}$);

the making of the read head further including:

making nonmagnetic electrically insulative first and second gap layers with the spin valve sensor and the first and second leads located therebetween; and forming ferromagnetic first and second shield layers with the first and second gap layers located therebetween; and the making of the write head comprising:

forming first and second pole piece layers with each of the first and second pole piece layers having a yoke portion located between a pole tip portion and a back gap portion;

forming a nonmagnetic electrically insulative write gap layer between the pole tip portions of the first and second pole piece layers;

forming an insulation stack with at least one coil layer embedded therein between the yoke portions of the first and second pole piece layers; and connecting the first and second pole piece layers at their back gaps portions.

33. A method as claimed in claim 32 wherein θ is less than 5°.

34. A method as claimed in claim 32 wherein θ is substantially 2°–3°.

35. A method as claimed in claim 32 wherein the pinned layer is made by:

forming first and second ferromagnetic pinned films with a magnetic moment of the first pinned film being pinned by the pinning layer in a direction; and forming an antiparallel (AP) coupling film between the first and second pinned films so that a magnetic moment of the second pinned film is pinned antiparallel to said direction of the magnetic moment of the first pinned film with the second ferromagnetic film exerting said ferromagnetic coupling field on the free layer.

36. A method as claimed in claim 35 wherein θ is less than 5°.

37. A method as claimed in claim 35 wherein θ is substantially 2°–3°.

* * * * *